United States Patent [19]

Neddo

[11] Patent Number: 5,358,371
[45] Date of Patent: Oct. 25, 1994

[54] PIPE HAULING AND FUSION TRAILER

[76] Inventor: E. John Neddo, 4607 S. Conklin Rd., Greenacres, Wash. 99016

[21] Appl. No.: 5,655

[22] Filed: Jan. 19, 1993

[51] Int. Cl.⁵ ............................................. F16L 1/024
[52] U.S. Cl. ................................. 414/745.5; 198/532; 414/519
[58] Field of Search ............... 414/745.4, 745.5, 746.4, 414/519; 198/532

[56] References Cited

U.S. PATENT DOCUMENTS

| | | | |
|---|---|---|---|
| 141,098 | 7/1873 | Abeel | 414/531 |
| 2,780,376 | 2/1957 | Sanders | 414/746.4 |
| 2,935,214 | 5/1960 | Fly | 414/539 |
| 3,565,269 | 2/1971 | Martin | 414/746.7 |
| 3,587,885 | 6/1971 | Hanway | 414/746.7 |
| 3,685,670 | 8/1972 | Meyers | 414/746.6 |
| 3,757,927 | 9/1973 | Gable et al. | 414/746.4 |
| 3,858,731 | 1/1975 | Briggs | 414/746.7 |
| 3,956,901 | 5/1976 | Brown | 414/746.7 |
| 4,111,374 | 9/1978 | Mackaness | 414/745.5 X |
| 4,541,767 | 9/1985 | Daberkow | 414/746.7 |

Primary Examiner—Michael S. Huppert
Assistant Examiner—Janice Krizek
Attorney, Agent, or Firm—Wells, St. John, Roberts, Gregory & Matkin

[57] ABSTRACT

A pipe hauling trailer is described for hauling and dispensing individual sections of elongated pipe for joining in end-to-end relation to form a pipeline. The trailer also includes structure for mounting pipe section end joining machinery, so the pipeline may be assembled directly from the trailer. The trailer includes racks for supporting the stack of pipe sections. Escapement cams are positioned at a bottom corner of the rack and are manually movable to engage individual pipe sections from the bottom of the stack, and to deliver the individual pipe sections to a dispensing station, where the pipe sections are supported by rollers for longitudinal movement rearward of the frame. A movable support is provided for a conventional pipe end joining machine on the trailer frame, so the successive pipe sections moving longitudinally from the frame may be joined end to end, thereby forming the pipeline directly from the present trailer. The support is movable relative to the frame, to enable precise positioning of the joining equipment relative to the pipe ends to be joined. A support cart is provided to receive and movably support successive pipe sections received from the joining machine.

20 Claims, 5 Drawing Sheets

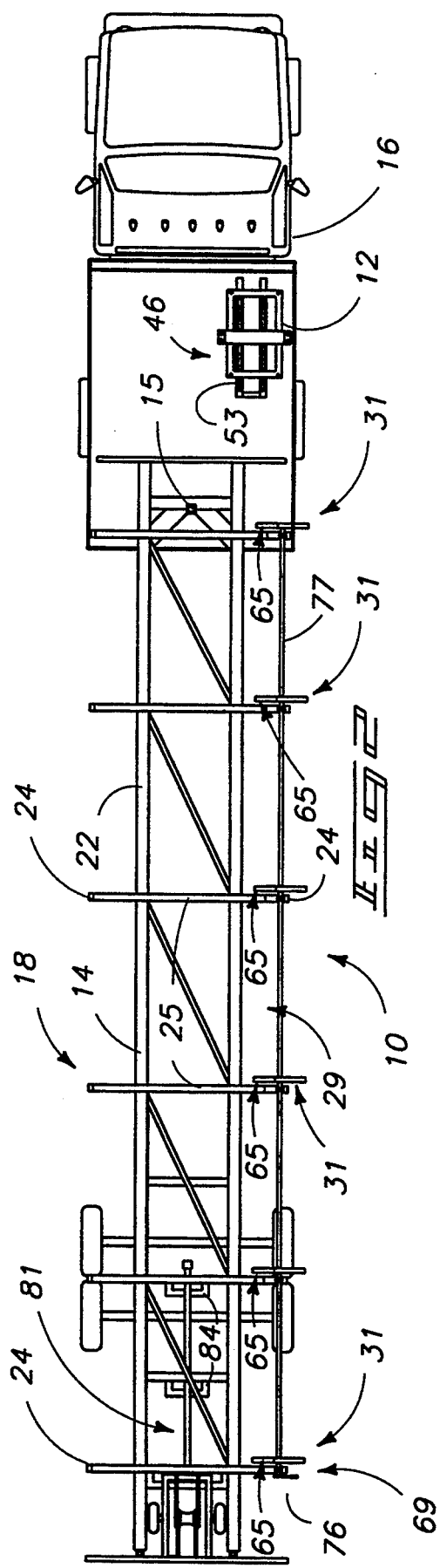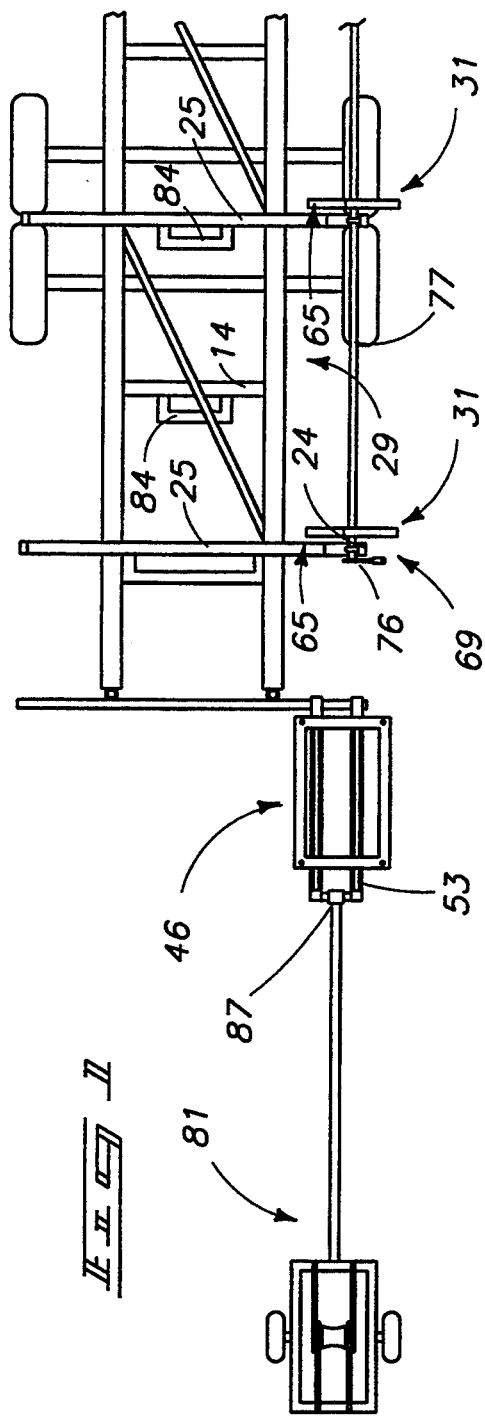

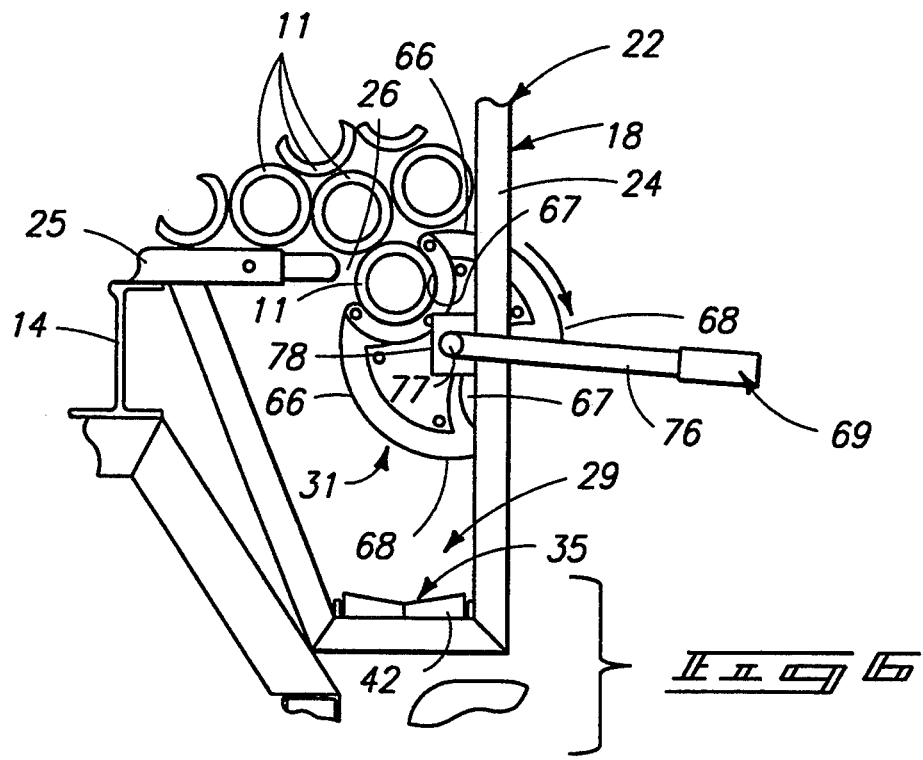
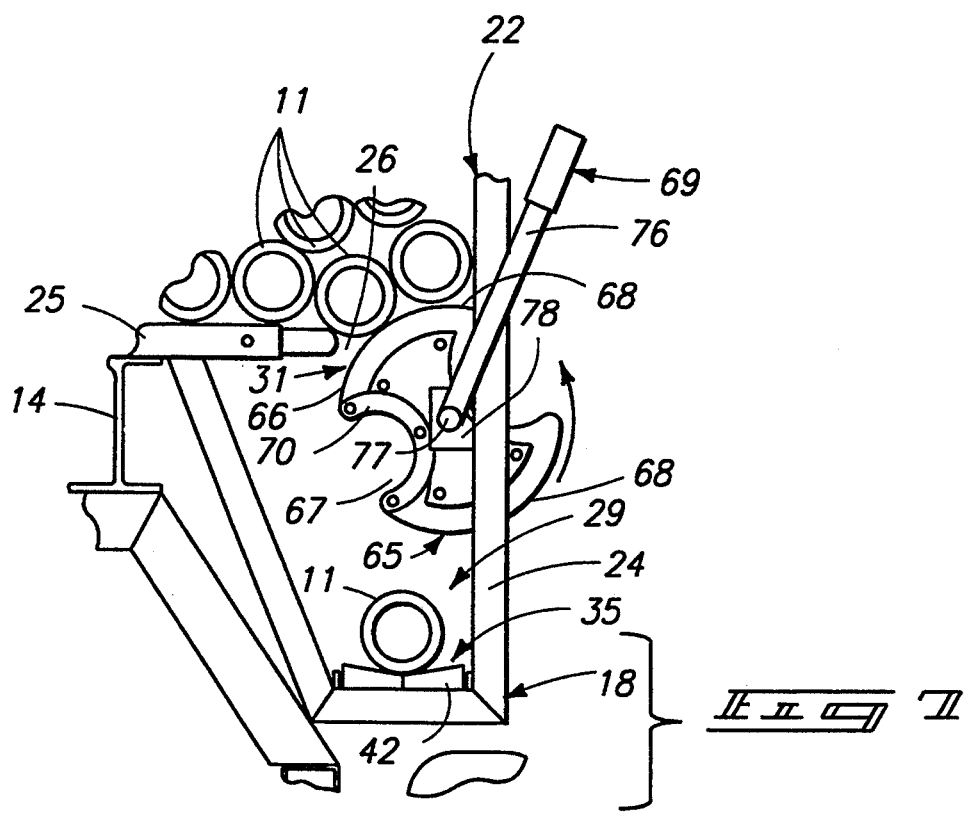

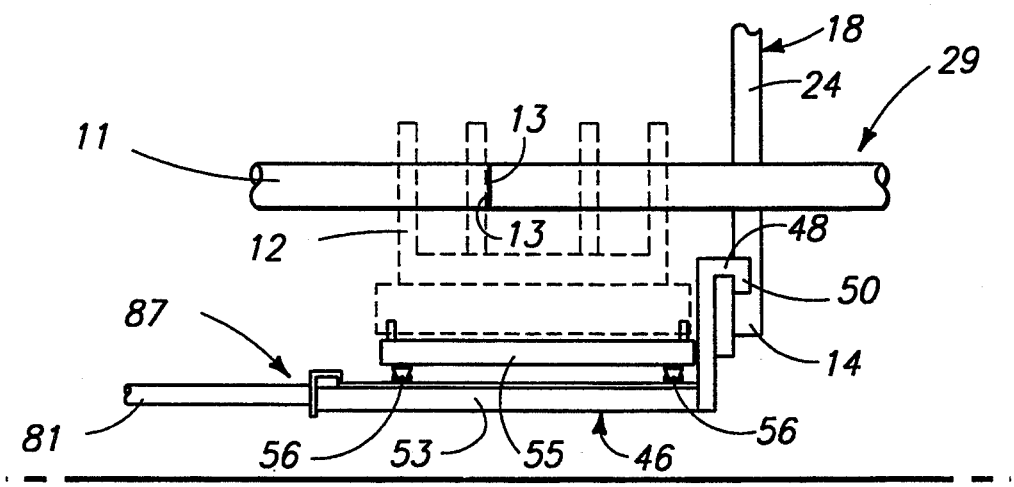
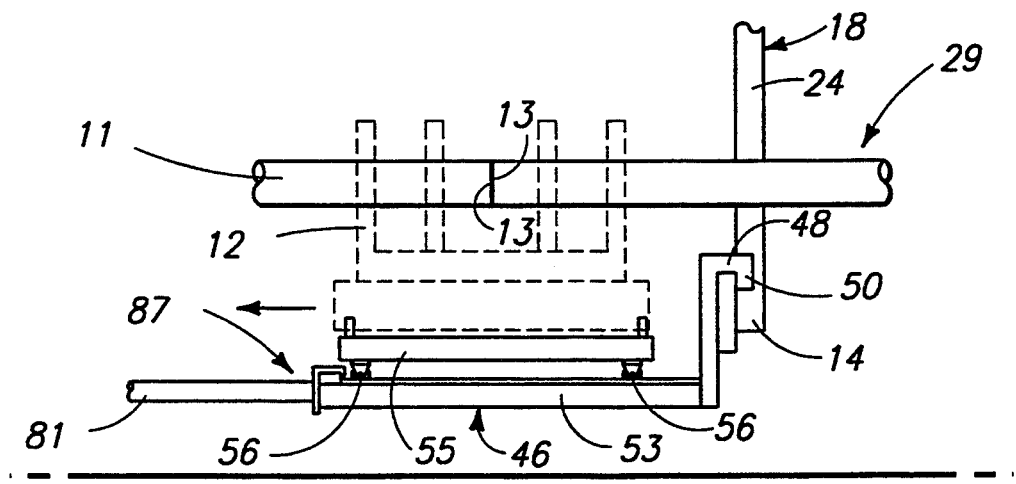
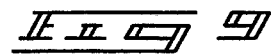

PIPE HAULING AND FUSION TRAILER

TECHNICAL FIELD

The present invention relates to carriers for elongated pipeline sections, and to dispensation of such pipeline sections in a manner to enable joining of successive pipeline sections in end-to-end relation.

BACKGROUND OF THE INVENTION

Elongated sections of pipe are commonly used to form long pipelines for delivering fluids from one location to another. Such fluids include, for example: natural gas, water, oil, and other flowable materials. Pipelines for carrying such materials often extend for miles in shallow, covered trenches. The trenches are typically, but not always formed along roadways, fence lines, railroads or power line right of ways.

A typical pipeline construction begins with digging the trench. Sections of pipe are then delivered to areas along the trench. The pipe sections are often delivered in banded bundles at intervals spaced by distances calculated to include the total length of the sections in a single bundle. Alternatively, selected numbers of pipes are deposited in groups along the trench. Single sections are not often spread along the ground because of the difficulty and time consumed in manually moving individual sections from the carrier.

The individual pipe sections are taken from the bundles or groups, and are moved along the trench, usually by a truck or tractor, to points where they are to be connected to the end of the pipeline being formed in the trench. This often means a crew must: (1) move to a bundle, (2) undo the bundle, (3) select one or more sections, (4) move the sections to the proper spot along the trench, (5) set the sections in place (where another person or crew joins the section ends together). The process then starts over again for the next sections to be placed in the trench.

Obviously the above process for setting the individual pipe sections in a semblance of end-to-end relation for joining is a time consuming and tedious process. A need clearly exists for an improved apparatus by which individual pipe sections may be delivered successively for joining in a pipeline. It is also desirable to join the individual sections as they are delivered from the carrier.

Various forms of joining tools have been developed for joining the individual pipe sections in end-to-end relation. Such tools typically are independent of the pipeline delivering vehicles. Separate transport is required for joining machinery that must be moved forward in increments as the pipe sections are joined. The additional support equipment adds expense and personnel to the construction endeavor.

The need for pipe section delivering equipment has been recognized, but has not been successfully filled by prior known apparatus.

For example, U.S. Pat. No. 2,780,376 to Sanders discloses a machine for continuously joining pipe sections in which a trailer for supporting a stack of irrigation pipe sections is attached to a towing vehicle. An elaborate escapement mechanism is provided centrally under the pipe section stack. A zig-zag passageway for the pipe sections is provided, leading downwardly to the escapement mechanism, to assure a single file stack of pipe sections are delivered to the escapement.

The Sanders mechanism and the required feed arrangement takes up a significant amount of space on the trailer that could otherwise be used for the stack of pipe sections. Further, the central, under-frame location for dispensing the sections is not desirable when pipe sections are to be connected end-to-end in a trench to one side of the trailer as needed in pipeline construction. Still further, no provision is made to mount any form of joining mechanism to the dispensing trailer.

An apparatus for handling irrigation pipe similar to the Sanders machine is shown in the 1975 U.S. Pat. No. 3,858,731 to Briggs. Side discharge for irrigation pipe sections from a single tier stack on a trailer is shown in the 1972 U.S. Pat. No. 3,685,670 to Meyers.

U.S. Pat. No. 2,935,214 to Fly discloses an apparatus for attachment to a standard pipe or other "elongate materials" hauling trailer. The apparatus includes a linkage and operators that can be used to pick the top pipe section from a stack on the trailer and deliver it to the ground surface alongside of the trailer. Conversely, the apparatus may also be used to pick a pipe section up from the ground and deliver it to the top of the stack on the trailer. No disclosure is made regarding removal of the pipe sections longitudinally of the stack, nor is there disclosure of any form of device or apparatus on the trailer for aiding joining of the sections together.

Another side dispensing pipe section hauling trailer is disclosed in U.S. Pat. No. 3,587,885 to Hanway. Side mounted roller guides are mounted to the trailer frame to receive and longitudinally guide pipe sections from a necessarily small stack of sections on the trailer bed. No escapement mechanism is disclosed between the stack and trailer bed, so the stack will feed freely to the guide rollers.

U.S. Pat. No. 4,541,767 to Daberkow teaches a pipe loader/unloader conveyor that may be releasably attached to the side of a trailer bed for the purpose of aiding a worker in loading successive pipe sections by moving engaged pipe section ends up and laterally onto the trailer bed. The device may also be used for unloading the trailer. No longitudinal movement of the pipe sections, or joining of successive sections is provided for.

U.S. Pat. No. 3,956,901 to Brown discloses a composite machine for placing sewer tiles in a pre-formed trench. Among many other provisions, the Brown machine includes a tile storage and delivery apparatus, for delivering successive tiles into the formed trench where they are then joined to form a sewer line.

Brown's tile dispensing mechanism includes a central longitudinal roller conveyor mechanism that is fed successive tile lengths from the top of a stack by operation of an escapement mechanism. The escapement mechanism is comprised of vertically movable "knife" blades that are positioned laterally adjacent the top tiles of stacks which are laterally disposed to opposite sides of the roller conveyor. The tiles in the layers rest on racks that are inclined inwardly toward the roller conveyor.

Brown's escapement blades are successively raised and lowered to allow individual tiles to roll onto the inclined roller conveyor, which then guides the received tiles downwardly to a lowering hoist. No pipe sections are removed to the side of the frame, and no provision is made for carrying a joining mechanism on the frame for successively joining the sections together.

Another guide roller conveyor used to guide pipe sections downwardly into a trench is disclosed in U.S. Pat. No. 3,565,269 to Martin. The roller conveyor is mountable to the side of a trailer and is provided with a catwalk for enabling workers to stand while lifting successive pipe sections from a stack on the trailer to the conveyor. No escapement mechanism is thus disclosed, nor is there a suggestion of apparatus to mount a section joining device, since the disclosure exemplifies use with drain tiles that require no end joining procedures.

Gable et al. in U.S. Pat. No. 3,757,927 discloses a bar stock storage dispensing and feeding apparatus that is situated in a stationary position relative to metal working equipment such as a lathe, to feed successive lengths of bar stock to the lathe. A circular, slotted magazine mechanism is used to receive and store successive groups of bars fed one at a time from a bar support rack.

Gable et al. do not disclose the device in connection with mounting to a pipe section hauling trailer, nor are there provisions indicating utility of the magazine as an escapement mechanism adjacent a stack of bar sections. To the contrary, the Gable et al. magazine itself constitutes a storage device.

Even with the above numerous attempts at a solution to the problem of adequately dispensing pipe sections from a trailer, a need remains for a trailer with structural features that will facilitate dispensation and, if desired, joining of successive pipe sections as they are delivered.

BRIEF DESCRIPTION OF THE DRAWINGS

Preferred embodiments of the invention are described below with reference to the accompanying drawings, which are briefly described below.

FIG. 1 is a fragmented top plan view of the present trailer in an operative condition;

FIG. 2 is a top plan view of the present trailer attached to a towing vehicle and in a transport condition;

FIGS. 6 and 7 are operational views illustrating functioning of the escapement means to receive and release an individual pipe section; and FIGS. 8 and 9 are fragmented operational views illustrating a carriage and carriage support means for mounting a fusion machine and positioning of the machine to facilitate fusion of pipe ends in a joint.

DETAILED DESCRIPTION OF THE PREFERRED EMBODIMENTS

Figure 3:
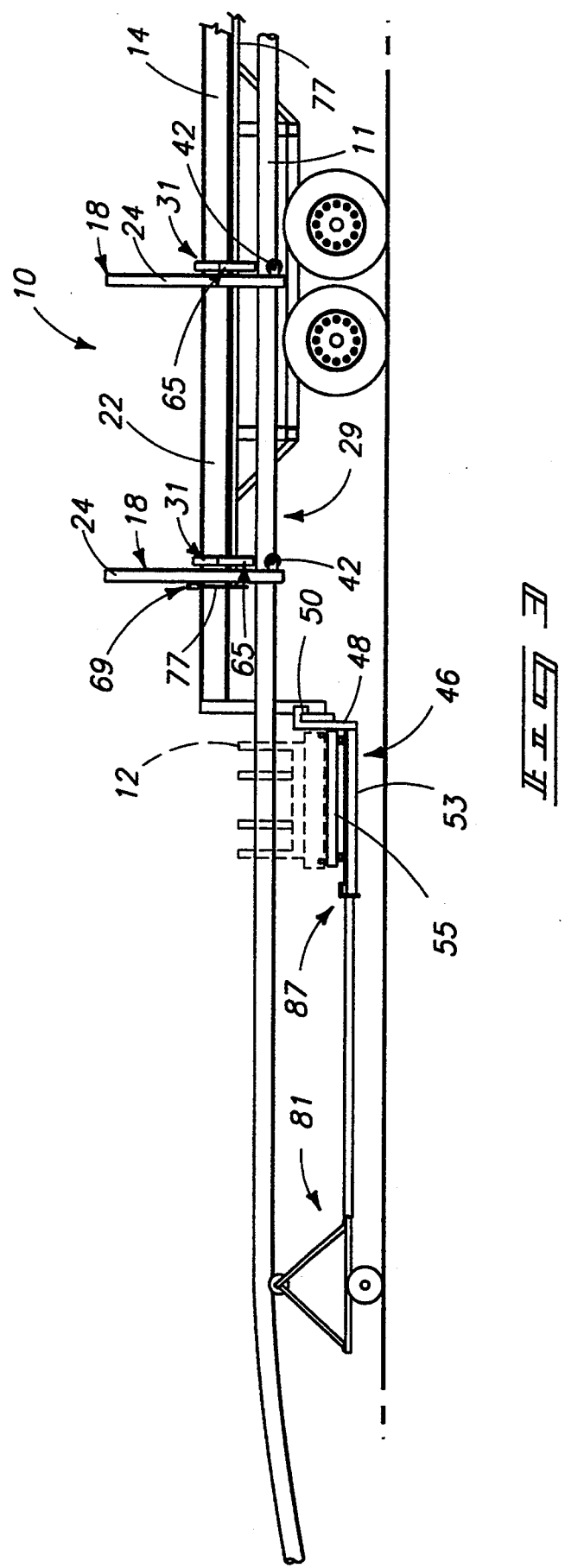
FIG. 3 is a fragmented side elevation view illustrating the trailer in operation.

This disclosure of the invention is submitted in furtherance of the constitutional purposes of the U.S. Patent Laws "to promote the progress of science and useful arts" (Article 1, Section 8).

A trailer embodying principal components of the present invention is generally indicated in the drawings by the reference numeral 10. The trailer 10 is provided for supporting and dispensing individual elongated pipe sections 11 to a pipe joining machine 12 where successive pipe sections may be bonded, fused or otherwise connected at facing pipe section ends 13 to form an elongated pipe line.

The present trailer includes an elongated frame 14 that is preferably wheel supported and adapted at a towing connection 15 for connection to a towing vehicle 16 (FIG. 2). The wheel support and towing connection for the present trailer may be any selected from conventional wheel support and towing connection arrangements commonly available in the transportation industry.

Figure 4:
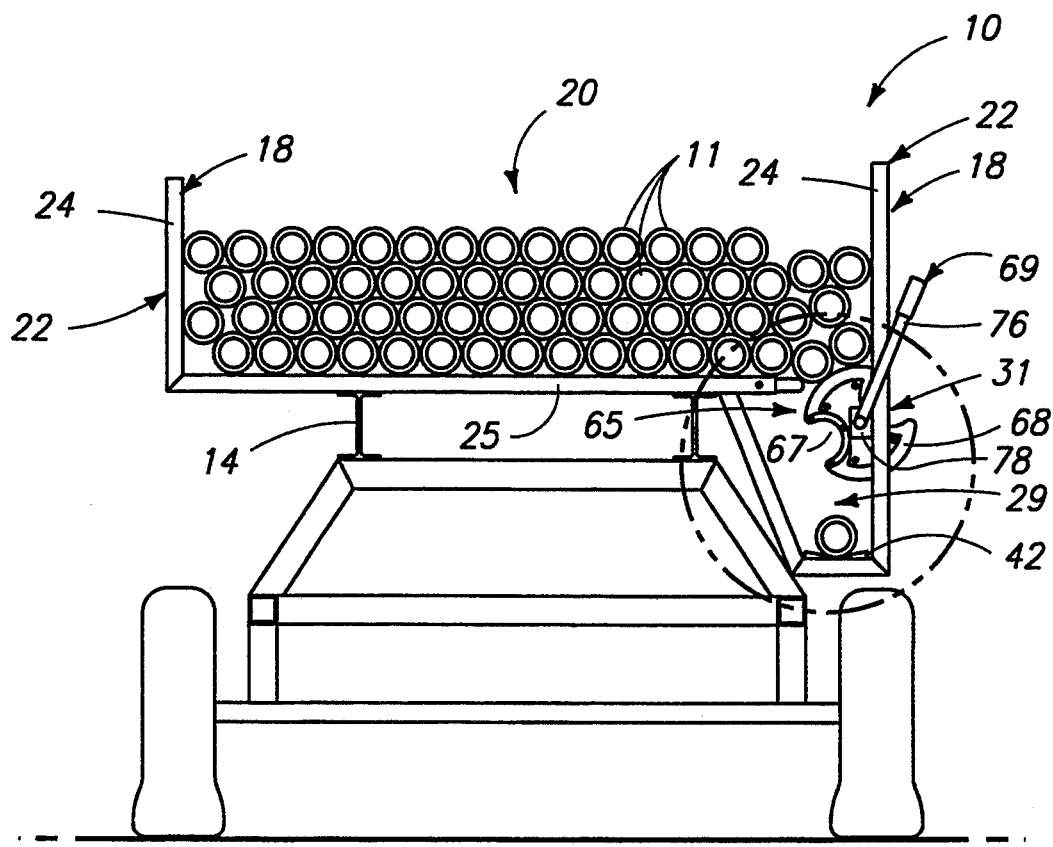
FIG. 4 is an enlarged end view of the trailer with a load of pipe sections mounted thereon.
Figure 5:
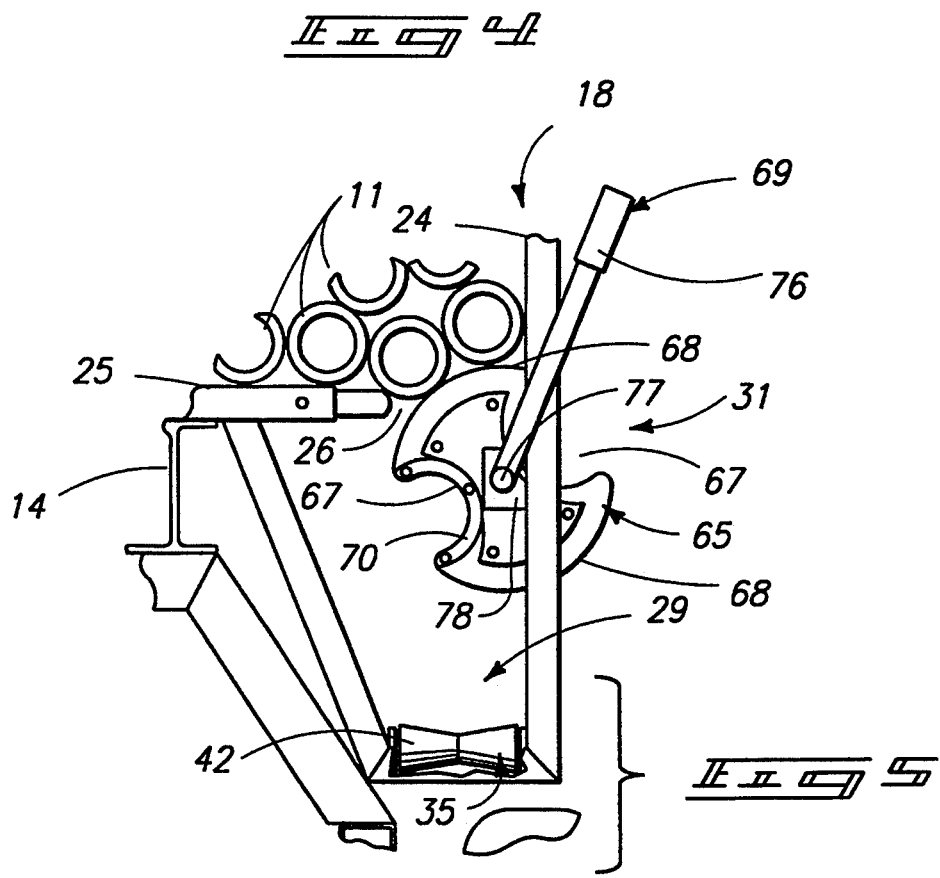
FIG. 5 is an enlarged fragmented detail view of the escapement means for the present trailer arrangement.

The elongated frame 14 is preferably constructed of rigid metal members, including a rack means 18 for supporting and releasably confining a stack 20 (FIG. 4) of individual elongated pipe sections 11.

The rack frame includes longitudinal sides 22 (FIG. 4) defined by rack stakes 24 that extend upwardly therefrom. The floor of the rack means 18 is defined by horizontal transverse floor members 25. The number and spacing of the floor members 25 and stakes 24 depend substantially on the overall length of the pipe sections 11 being utilized. Thus, the frame length may vary according to the particular pipe section length to be handled.

The rack means 18 defines a pipe discharge opening 26 along the floor members 25, and adjacent one of the sides. Pipe sections 11 drop by gravity through the pipe discharge opening 26.

A dispensing station 29 is situated along the frame 14 toward at least one of the sides 22 and below the pipe discharge opening 26. The dispensing station is shown in particular detail in FIGS. 4–7 of the drawings. The dispensing station is partially defined by a longitudinal pipe section delivery means 35 on the frame used for supporting successive pipe sections for longitudinal movement from the dispensing station. The delivery means 35 is advantageously comprised of a plurality of rollers 42 mounted to the frame along the dispensing station for freely supporting the individual pipe sections for longitudinal movement from the trailer and to downstream pipe end joining apparatus described below.

Downstream from the longitudinal pipe section delivery means 35 is a support means 46 (FIGS. 1, 8, and 9) that is releasably attached to the frame adjacent the dispensing station. Support means 46 is adapted to mount and selectively position a pipe end joining machine 12 in relation to the dispensing station to receive successive pipe sections from the dispensing station. Means 46 enables the pipe end joining machine to be operated to join adjacent pipe section ends 13 together. Thus, the support means facilitates mounting of the pipe end joining machine 12 in such a manner that the present trailer may be used to deliver and join pipe in end-to-end relation and thereby form a complete pipe line structure as the individual pipe sections are removed from the trailer.

As indicated above, the support means 46 is releasably mounted to the frame. To this end, bracket means 48 is provided for removably mounting the support means to the frame. More specifically, the bracket means 48 may be advantageously comprised of a hanger member 50 on the support member 46 for releasably engaging and suspending the support means from the frame. The hanger member 50 is clearly shown in FIGS. 8 and 9 and is simply comprised of a hook configuration that is releasably received over a rearward end portion of the frame 14 in alignment, as shown in FIG. 1, with the dispensing station 29.

The support means 46 includes a carriage support 53, simply comprised of a rigid rectangular framework that is adapted to movably mount a carriage means 55. The carriage means 55 is movably mounted to the carriage support 53 for selective longitudinal movement thereon as indicated by opposed extreme positions in FIGS. 8 and 9.

The carriage means 55 is comprised simply of a rigid rectangular framework mounted by wheels 56 (FIGS. 8, 9) running in longitudinal tracks on the carriage support framework 53.

The carriage means 55 is adapted to receive and mount a conventional pipe end joining machine 12 as shown by dashed lines in FIGS. 8 and 9. An example of such a machine is the "McElroy's Model 28" fusion machine produced and distributed by McElroy Mfg. Inc. of Tulsa, Okla. The joining machine 12 may also be another known form of machine used to fuse, glue, weld, or otherwise secure successive pipe sections in end-to-end relationship. Thus, the carriage means may be adapted to mount a variety of joining machinery and, to this end, may be varied in scale and relationship to the general framework in order to provide such support.

It is noted that the carriage means 55 will move longitudinally along the carriage support 53. This feature facilitates fine positioning of the pipe joining machine 12 mounted thereon so that the joining machine may be easily moved into an operative position as indicated at FIG. 9, for proper functioning in joining the facing pipe ends 13 together. This feature removes the need for the driver of the towing vehicle to stop precisely at the right forward position in relation to the pipe end joining machine 12 during operation. Instead, the trailer can be roughly positioned, and the end joining machine on the carriage means 55 may then be selectively moved forward or rearwardly to precisely position the joining machine where needed for effective joining procedures.

An escapement means 31 (FIGS. 4–7) is situated below and spanning the discharge opening 26 between the rack means 18 and dispensing station 29 for the purpose of receiving and depositing individual elongated pipe sections 11 to the dispensing station 29.

The escapement means 31 is shown in detail in FIGS. 4–7. Escapement means 31 is advantageously comprised of a number of escapement cams 65 pivotably mounted to the frame 14. The escapement cams 65 each include a stack support surface 68 for spanning the pipe discharge opening 26, and at least one pipe section receiving recess 67 thereon.

Preferably, the escapement cams 65 will include more than one recess 67, with each appropriately sized to receive a particular pipe diameter. In the drawings, two opposed recesses are shown, one for receiving one pipe diameter and the other for receiving a larger diameter. These recesses are positioned between the stack support surfaces 68 which are substantially circular about the central pivot axis for the escapement. The size variations may be adapted to other pipe sizes by provision of adapters 70 (FIG. 5) that may be bolted to the cams over the original recesses 67.

The cams are mounted to a single elongated shaft 77 that is rotatably mounted on the rack for pivoted motion about a longitudinal axis parallel to the lengths of pipe sections carried on the rack.

An operator means is generally indicated at 69 for selectively pivoting the shaft 77 and the escapement cams 65. The cams will thus move between (a) a first position (FIG. 5) wherein the stack support surfaces 68 are positioned to engage and support pipe sections in the rack means 18; (b) a second position (FIG. 6) wherein the pipe section receiving recesses are positioned to receive a pipe section from the stack; and (c) a third discharge position (FIG. 7) wherein a pipe section received within the pipe section receiving recesses is deposited to the dispensing station 29.

The operator means 69 is advantageously comprised of a lever arm 76 that is manually movable to shift the escapement cams between the above-described positions. The lever arm 76 is secured to the pivot shaft 77 which, in turn, rigidly mounts the escapement cams 65. Thus, pivotal movement of the lever arm 76 will cause corresponding pivotal motion of the shaft 77 and the attached escape merit cams 65. Relatively free pivotal motion of the lever arm 76, pivot shaft, and escapement cams 65 is afforded by spaced bearings 78 rotatably mounting the shaft to the elongated frame 14.

It is noted that the lever arm 76 may be selectively pivoted to bring either of the exemplified recesses 67 into position to receive an individual pipe section from the rack means 18. However, to enable consistent operation, it is advantageous that the lever arm 76 be removably attached to the pivot shaft in such a manner that the lever arm may be attached as shown, or removed and reattached at a desired angular relationship with respect to the remaining pipe section receiving recesses so that operation using the alternate recess will be similar to that shown in FIGS. 5–7. Thus, the lever arm 76 may be movably attached as by cotter pins, set screws or the like to the pivot shaft 77 to facilitate alternate lever arm positioning.

As shown in FIGS. 1, 2, and 3, a detachable cart means 81 is provided, releasably mounted to the frame 14 and adapted for receiving pipe sections from the pipe end joining machine 12. The detachable cart means 81, when in operation, is situated downstream of the support means 46 as shown in FIG. 1 and 3. The cart means 81, so positioned, is useful to movably support the pipe sections in a smooth, depending curvature from the trailer to the ground surface, or an adjacent trench.

The present trailer, in a preferred form also includes a cart support means 84 on the framework, for receiving and storing the cart means 81 in a stowed, transport condition (FIGS. 2, 1). The cart support means 84 may simply be comprised of cross members on the frame that will releasably receive and support the cart member and its tongue section beneath the rack means 18 substantially as shown in FIG. 2. Appropriate connector mechanisms such as straps, chains, hooks, etc. may be selectively used to releasably suspend the cart from the trailer frame 14.

A coupler means 87 is provided on the detachable cart means 81 for releasably joining the cart means to the support means 46. The coupler means 87 may simply be comprised of a hook arrangement at a forward end of the cart tongue that fits over the carriage support frame 53 (FIGS. 8, 9) in a manner substantially similar to the manner by which the hanger 50 supports the carriage support frame as shown in FIGS. 8 and 9. Thus, the detachable cart is secured indirectly to the elongated frame 14 through the intermediate connection between the carriage support means 46 and the trailer frame 14.

Operation of the present invention may be easily understood from the above description and drawings. Initially, the present trailer may be attached in the usual manner to a towing vehicle such as a truck. The trailer then becomes mobile and may be transported easily from a source of pipe sections to an area where the sections are to be removed and attached in end-to-end relation to form a pipe line.

Loading of the present trailer is accomplished in the same manner used in loading procedures for pipe lengths or individual pipe sections in the past. The pipe sections are either loaded individually by manual means, or by appropriate loading devices such as cranes, fork lifts, etc. Enough of the individual pipe sections are placed on the towing vehicle within the rack means 18 to constitute a load. The overall size of the frame will affect the number of pipe sections received on the rack. However, it is estimated that a standard load may be received on the rack similar to that experienced in conventional trailering arrangements where stacks of pipe lengths are delivered to work sites.

Loading of the pipe will not affect operation of the present invention, nor will the invention alter the normal loading procedures for the sections. Referring to FIG. 7, it will be seen that the stack support surfaces 68 of the escapement cams 65 will span the otherwise open area through which individual pipe sections may be dropped to the dispensing station 29. The cams will be positioned in this location during loading and transport of the individual pipe sections.

When the trailer is situated at a job site, operation may begin to selectively dispense individual pipe sections from the present trailer. To begin this operation, an operator simply pulls the lever arm 76 downwardly as indicated in FIG. 6. This will bring the escapement cam pipe receiving recesses 67 into position to receive an individual pipe section from the stack as indicated in FIG. 6. Then, the operator may swing the lever arm 76 back upwardly as indicated in FIG. 7. The cams thus move the received pipe section downwardly and drop it onto the pipe section delivery means 35 below. As this happens, the stack support surfaces 68 swing back into position to prevent the remaining pipe sections in the stack from dropping into the dispensing station. Thus a single pipe section is received at the dispensing station for longitudinal movement to the pipe joining machine.

The pipe joining machine 12 may be movably mounted to the present trailer 10 by way of the support means 46 which may be releasably carried on the truck as shown in FIG. 2 during transport and attached to the rearward end of the frame for operation as shown in FIGS. 1, 8 and 9. To do this, the frame is simply moved from the truck to the back of the frame where it is attached by the bracket means 48 to the rearward bumper member or rearwardmost horizontal member of the trailer frame. Care is taken to align the support means 46 with the pipe section currently held at the dispensing station 29.

The detachable cart means 81 is also mounted as shown in FIG. 1. This is done simply by lifting the cart from engagement with the frame where it was held for transport as shown in FIG. 2, and moving it into alignment behind the support means 46. The coupler 87 is then attached to the carriage support frame 53. The cart will now move in alignment behind the support means and in alignment with the dispensing station 29.

The first received pipe section is manually moved from the dispensing station past the pipe joining machine 12 to a position where the forwardmost end of the pipe section is situated at a desired position in relation to the joining machine 12.

Next, the operator means 69 is again actuated to deliver a second pipe section to the dispensing station 29. This pipe section is again moved manually, longitudinally to the pipe joining machine where its end will come into close proximity or abutment with the forwardmost end of the first pipe section. The joining machine 12 may then be moved forward or rearwardly to properly situate the joining machine in relation to the facing pipe ends. This is done simply by moving the joining machine back or forwardly as provided by the carriage support 53 and carriage 55. Once properly positioned, the joining machine may be operated in the manner prescribed by the joining machine manufacturer to cause the ends of the pipes to be joined.

Following joining of the individual pipe sections, one of two further steps may be taken to continue the process. With lightweight, plastic pipe sections, it may well be that a worker will simply pull the two joined sections rearwardly until the forwardmost end of the second pipe section comes into a desired longitudinal position with respect to the joining machine 12. This is a relatively simple matter, especially with provision of the detachable cart which includes a freewheeling roller support for the pipeline.

Alternatively, the towing vehicle may be moved ahead while the first and second pipe sections are held stationary. These sections will therefore roll rearwardly along the dispensing station until the forwardmost end of the second pipe section comes into a desired position with respect to the joining machine. The vehicle is then stopped.

Next, the escapement mechanism is again operated by the procedures described above and illustrated in FIGS. 6 and 7 to dispense a third pipe section from the stack onto the dispensing station 29. This pipe is then moved longitudinally by provision of the rollers along the dispensing station until the rearward end of the third pipe section comes into abutting or close proximity with the forward end of the second pipe section.

Once again, the pipe joining machine 12 may be selectively positioned longitudinally with respect to these pipe ends by provision of the carriage 55 and support 53. Once in position, the pipe joining machine may be operated to fasten the adjacent ends of the pipe together and thus add the third section of pipe to the growing pipeline.

The above process is repeated in succession until every pipe section on the trailer has been dispensed and connected to the growing length of pipeline.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A trailer for supporting and dispensing individual elongated pipe sections to a pipe end joining machine, comprising:

an elongated frame adapted for connection to a towing vehicle;

rack means on the elongated frame for supporting and releasably confining a stack of elongated pipe sections;

said rack means defining a pipe discharging opening for gravitationally discharging pipe sections from the rack means;

a dispensing station along the frame substantially vertically below the pipe discharge opening;

escapement means on the frame spanning the pipe discharge opening between the pipe discharge opening and dispensing station for receiving individual elongated pipe sections and delivering said pipe sections to the dispensing station;

wherein the escapement means includes a stack support surface positioned to substantially span the pipe discharge opening and support the pipe sections within the rack means above the discharge opening, and a substantially semi-circular recess, pivotable about an axis below the pipe discharge opening for receiving successive pipe sections directly from the pipe discharge opening and delivering the successive pipe sections to the dispensing station;

longitudinal pipe section delivery means on the frame at the dispensing station for supporting successive pipe sections for movement longitudinally from the dispensing station; and support means on the frame adjacent the dispensing station and delivery means, for mounting and selectively positioning a pipe end joining machine on the frame in alignment with the dispensing station to receive successive pipe sections from the dispensing station so the pipe end joining machine may be operated to join adjacent pipe section ends together.

2. A trailer for supporting and dispensing individual elongated pipe sections to a pipe end joining machine as claimed by claim 1 wherein the support means includes:
a carriage support mounted to the frame; and
carriage means mounted to the carriage support for selective longitudinal movement thereon, and adapted to receive and mount the pipe end joining machine.

3. A trailer for supporting and dispensing individual elongated pipe sections to a pipe end joining machine as claimed by claim 1 wherein the support means includes:
a carriage support removably mounted to the frame; and
carriage means mounted by freely rotatable wheels to the carriage support for free selective longitudinal movement thereon, and adapted to receive and mount the pipe end joining machine.

4. A trailer for supporting and dispensing individual elongated pipe sections to a pipe end joining machine as claimed by claim 1 further comprising:
bracket means for removably mounting the support means to the frame.

5. A trailer for supporting and dispensing individual elongated pipe sections to a pipe end joining machine as claimed by claim 1 further comprising:
bracket means for removably mounting the support means to the frame, and including a hanger member on the support means for releasably engaging and suspending the support means from the frame.

6. A trailer for supporting and dispensing individual elongated pipe sections to a pipe end joining machine as claimed by claim 1 wherein the escapement means on the frame includes:
at least one escapement cam pivotably mounted to the frame on said axis and wherein said stack support surface is a substantially semicircular surface on the escapement cam leading to the pipe receiving recess; and
operator means for selectively moving the escapement cam between (a) a first position wherein the stack support surface is positioned to engage and support pipe sections in the rack means across the pipe discharge opening; (b) a second position wherein the pipe section receiving recess is positioned to receive a pipe section from the stack; and (c) a third discharge position wherein a pipe section received within the pipe section receiving recess is deposited directly from the recess into the dispensing station.

7. A trailer for supporting and dispensing individual elongated pipe sections to a pipe end joining machine as claimed by claim 1 wherein the escapement means on the frame includes:
a plurality of escapement cams movably mounted to the frame, each including a stack support surface and pipe section receiving recesses, each receiving recess being adapted to receive a pipe section of a prescribed diameter.

8. A trailer for supporting and dispensing individual elongated pipe sections to a pipe end joining machine as claimed by claim 1 wherein the escapement means on the frame includes:
a plurality of escapement cams movably mounted to the frame on a common pivot shaft centered on said axis, each escapement cam including said stack support surface and said pipe section receiving recess, said stack support surface and said pipe section receiving recess on respective escapement cams being axially spaced from and aligned with each other; and
operating means for selectively moving the escapement cams to successively receive individual pipe sections from the rack means within the pipe section receiving recesses, and to pivot the pipe section receiving recesses to deposit the individual pipe sections into the dispensing station and simultaneously pivot the stack support surfaces to span the pipe discharge opening.

9. A trailer for supporting and dispensing individual elongated pipe sections to a pipe end joining machine as claimed by claim 1 wherein the longitudinal pipe section delivery means is comprised of a plurality of rollers mounted to the frame along the dispensing station.

10. A trailer for supporting and dispensing individual elongated pipe sections to a pipe end joining machine as claimed by claim 1, further comprising:
detachable cart means releasably mounted to the frame and adapted for receiving pipe sections from the pipe end joining machine.

11. A trailer for supporting and dispensing individual elongated pipe sections to a pipe end joining machine as claimed by claim 1, further comprising:
a wheel supported detachable cart means releasably mounted to the frame and adapted for receiving pipe sections from the pipe end joining machine; and
cart support means on the frame for receiving and storing the cart means in a stowed transport condition.

12. A trailer for supporting and dispensing individual elongated pipe sections to a pipe end joining machine as claimed by claim 1, further comprising:
a detachable cart means adapted for receiving pipe sections from the pipe end joining machine; and
coupler means for releasably joining the cart means to the frame.

13. A trailer for supporting and dispensing individual elongated pipe sections to a pipe end joining machine as claimed by claim 1, further comprising:

a wheel supported detachable cart means adapted for receiving pipe sections from the pipe end joining machine; and coupler means for releasably connecting the cart means to the support means.

14. A trailer for supporting and dispensing individual elongated pipe sections to a pipe end joining machine as claimed by claim 1 wherein the rack means is comprised of upright stakes and substantially horizontal transverse floor members mounted to the frame; and wherein the dispensing station and escapement means are situated laterally adjacent the transverse floor members.

15. A trailer for supporting and dispensing individual elongated pipe sections to a pipe end joining machine as claimed by claim 1 wherein:

said frame includes longitudinal sides;

wherein the rack means is comprised of upright stakes along the longitudinal sides, and substantially horizontal transverse floor members mounted to the frame; and wherein the dispensing station is defined by said upright stakes on one side of the frame; and wherein the escapement means is situated laterally adjacent to and downward of the transverse floor members.

16. A trailer for supporting and dispensing individual elongated pipe sections to a location laterally adjacent a stack of pipe sections held on the trailer, comprising:

an elongated wheel supported frame;

means for connecting the wheel supported frame to a towing vehicle;

rack means on the elongated wheel supported frame for supporting and releasably confining a stack of elongated pipe sections;

wherein the rack means includes substantially horizontal floor members on the frame;

a dispensing station along the frame situated at a side of and under the rack means;

a pipe discharge opening along the horizontal floor members above the dispensing station for gravitationally discharging pipe sections toward the dispensing station;

escapement means on the frame spanning the pipe discharge opening and between the rack means and dispensing station, and having a stack supporting surface selectively pivotable about an axis for selectively spanning the pipe discharge opening to support pipe sections within the rack means above the pipe discharge opening, and a pipe receiving recess for pivotal movement on the axis to selectively receive and deposit individual elongated pipe sections from the pipe discharge opening to the dispensing station.

17. A trailer for supporting and dispensing individual elongated pipe sections to a location laterally adjacent a stack of pipe sections held on the trailer, as claimed by claim 16 further comprising:

longitudinal pipe section delivery means on the frame at the dispensing station for supporting successive pipe sections for movement longitudinally from the dispensing station.

18. A trailer for supporting and dispensing individual elongated pipe sections to a location laterally adjacent a stack of pipe sections held on the trailer, as claimed by claim 16 further comprising:

longitudinal pipe section delivery means on the frame at the dispensing station for supporting successive pipe sections for movement longitudinally from the dispensing station; and wherein the longitudinal pipe section delivery means is comprised of a plurality of rollers mounted to the frame along the dispensing station.

19. A trailer for supporting and dispensing individual elongated pipe sections to a location laterally adjacent a stack of pipe sections held on the trailer, as claimed by claim 16 wherein the escapement means on the frame includes:

a plurality of escapement cams mounted to a pivot shaft for selective common pivotal movement on the frame, each cam including said stack supporting surface and said pipe section receiving recess, each receiving recess being configured to receive a pipe section of a prescribed diameter.

20. A trailer for supporting and dispensing individual elongated pipe sections to a location laterally adjacent a stack of pipe sections held on the trailer, as claimed by claim 16 wherein the escapement means on the frame includes:

a plurality of escapement cams pivotably mounted to the frame and wherein the cams together define said stack support surface and pipe section receiving recess; and operator means for selectively moving the escapement cams between (a) a first position wherein the stack support surface is positioned to span the pipe discharge opening, to engage and support pipe sections in the rack means; (b) a second position wherein the pipe section receiving recess is positioned to receive a single pipe section from the stack; and (c) a third discharge position wherein the single pipe section received within the pipe section receiving recess is deposited into the dispensing station.

* * * * *